United States Patent
Mohrmann et al.

(10) Patent No.: US 8,359,386 B2
(45) Date of Patent: Jan. 22, 2013

(54) SYSTEM AND METHOD OF MIGRATING VIRTUALIZED ENVIRONMENTS

(75) Inventors: Vaden A. Mohrmann, Round Rock, TX (US); Madhusudhan Rangarajan, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 339 days.

(21) Appl. No.: 12/425,094

(22) Filed: Apr. 16, 2009

(65) Prior Publication Data

US 2010/0268812 A1 Oct. 21, 2010

(51) Int. Cl.
G06F 11/30 (2006.01)
(52) U.S. Cl. ........................................ 709/224
(58) Field of Classification Search .................. 709/224, 709/223, 220–222, 217; 718/1, 100
See application file for complete search history.

(56) References Cited

U.S. PATENT DOCUMENTS

| | | | |
|---|---|---|---|
| 7,380,119 B2 | 5/2008 | Bade et al. | |
| 7,392,403 B1 | 6/2008 | Munetoh | |
| 7,444,670 B2 | 10/2008 | Berger et al. | |
| 2007/0079120 A1 | 4/2007 | Bade et al. | |
| 2007/0094719 A1 | 4/2007 | Scarlata | |
| 2007/0300069 A1 | 12/2007 | Rozas | |
| 2008/0072287 A1 | 3/2008 | Movva et al. | |
| 2008/0155537 A1* | 6/2008 | Dinda et al. ................ | 718/1 |
| 2008/0178176 A1 | 7/2008 | Berger et al. | |
| 2008/0235804 A1 | 9/2008 | Bade et al. | |
| 2008/0244569 A1 | 10/2008 | Challener et al. | |
| 2009/0150529 A1* | 6/2009 | Tripathi ...................... | 709/222 |
| 2010/0161922 A1* | 6/2010 | Sharp et al. ................. | 711/162 |
| 2010/0199276 A1* | 8/2010 | Umbehocker ................ | 718/1 |

OTHER PUBLICATIONS

IBM, "Virtual Trusted Platform Module," printed from http://domino.research.ibm.com/comm/research_projects_nsf/pages/ssd_vtpm.index.html on Oct. 21, 2008, 4 pgs.
Berger et al., "vTPM: Virtualizing the Trusted Platform Module," printed from www.kiskeya.net/ramon/work/pubs/security06.pdf on Apr. 15, 2009, 16 pgs.
Rozas, Carlos, "Intel's Security Vision for Xen," Intel Corporation, Presentation from the Xen Summit, Apr. 7-8, 2005, 16 pgs.
Sailer, Reiner, "Security for the Xen Hypervisor—Status Quo & Perspective 2006," IBM Corporation, Presentation from the Xen Summit Jan. 17, 2006, 14 pgs.

* cited by examiner

*Primary Examiner* — Kenneth R Coulter
(74) *Attorney, Agent, or Firm* — Larson Newman, LLP

(57) ABSTRACT

A system and method migrating virtualized environments is disclosed. According to an aspect of the disclosure, the information handling system can include a migration monitor configured to initiate migration of a remote virtualized environment operating on a first remote system. The information handling system can also include a trusted platform module including a local memory storing a plurality of access keys configured to enable use of a plurality of virtualized environments. According to an aspect, the plurality of access keys can include a first access key configured to be used with a first remote system. The information handling system can also include a secure communication channel configured to enable a mapping of the first access key to a second remote system upon the migration monitoring determining the second remote system is capable of satisfying an operating characteristic of the remote virtualized environment.

20 Claims, 6 Drawing Sheets

SYSTEM AND METHOD OF MIGRATING VIRTUALIZED ENVIRONMENTS

FIELD OF THE DISCLOSURE

This disclosure relates generally to information handling systems, and more particularly to a system and method of migrating virtualized environments.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
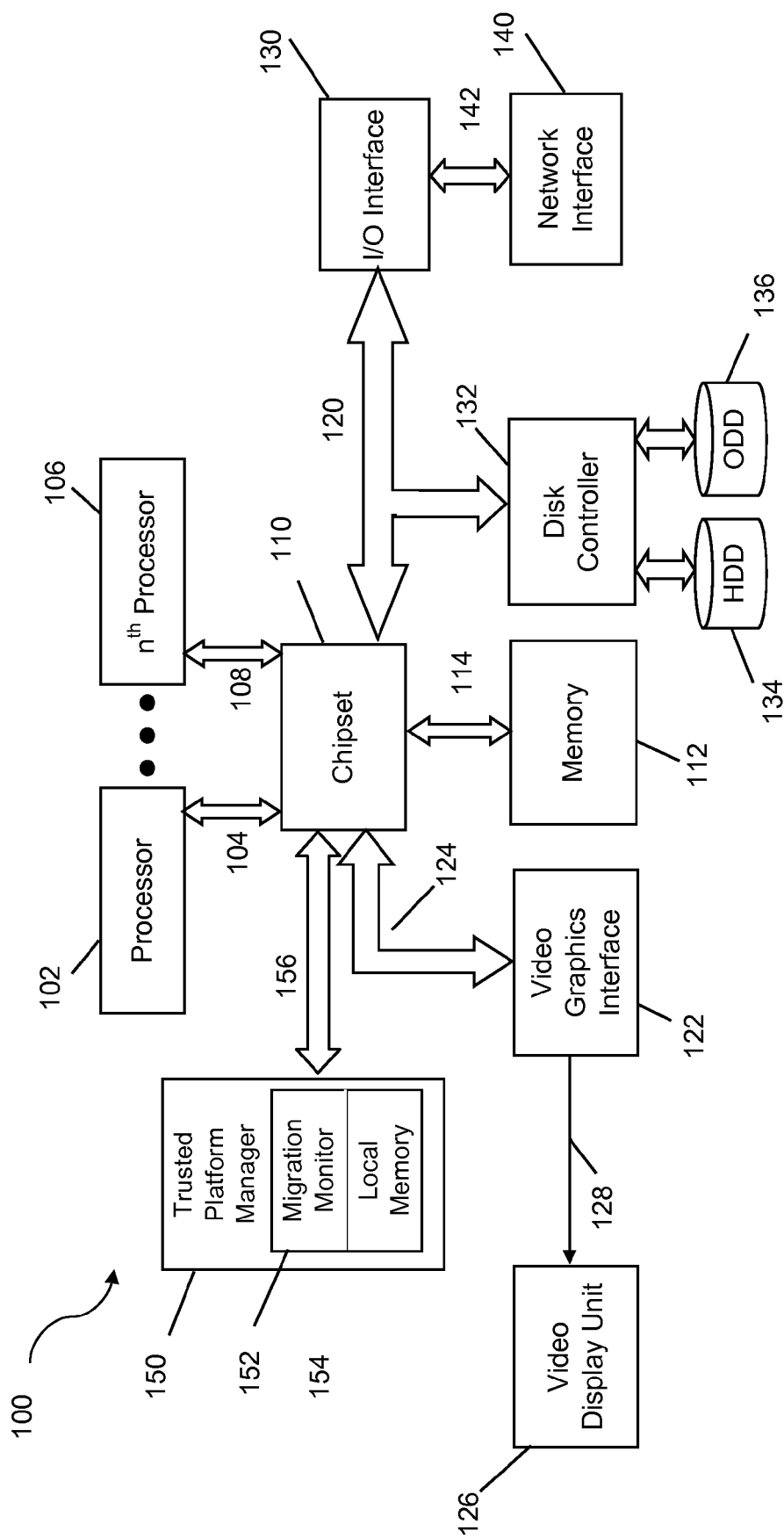
FIG. 1 illustrates a block diagram of an information handling system according to one aspect of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

In accordance with an aspect of the disclosure, an information handling system is disclosed. The information handling system can include a migration monitor configured to initiate migration of a remote virtualized environment operating on a first remote system. The information handling system can also include a trusted platform module including a local memory storing a plurality of access keys configured to enable use of a plurality of virtualized environments. According to an aspect, the plurality of access keys can include a first access key configured to be used with a first remote system. The information handling system can also include a secure communication channel configured to enable a mapping of the first access key to a second remote system upon the migration monitoring determining the second remote system is capable of satisfying an operating characteristic of the remote virtualized environment.

According to another aspect, a method of migrating a virtualized environment for use with an information handling system is disclosed. The method can include detecting a migration event of a remote virtualized environment, and detecting an availability of a destination system to migrate the remote virtualized environment. The method can also include detecting a security key of the destination system operable to enable use of the remote virtualized environment and stored within a local memory of a trusted platform module with a plurality of security keys configured to enable migration of virtualized environments. According to an aspect, the trusted platform module is not a part of the remote virtualized environment or the destination system.

According to a further aspect of the disclosure, an information handling system is disclosed. The information handling system can include a migration monitor configured to initiate migration of a remote virtualized environment operating on a first remote system, and a trusted platform module including a local memory storing a plurality of access keys configured to enable use of a plurality of virtualized environments. According to an aspect, the plurality of access keys includes a first access key configured to be used with a first remote system. The information handling system can also include a secure communication channel configured to enable a mapping of the first access key to a second remote system upon the migration monitoring determining the second remote system is capable of satisfying an operating characteristic of the remote virtualized environment. According to a further aspect, the migration monitor can be configured to detect an operating characteristic of the remote virtualized environment operating at the first remote system, detect the second remote system, and detect an operating capability of the second remote system. The migration monitor can further compare the operating capability of the second remote system to the operating characteristic of the remote virtualized environment, and initiate migration of the remote virtualized environment from the first remote system to the second remote system in response to a valid comparison result. The migration monitor can also disable migration of the remote virtualized environment from the first remote system to the second remote system in response to an invalid comparison result, and initiate identification of another remote system configured to satisfy the operating characteristic of the remote virtualized environment.

FIG. 1 illustrates a block diagram of an exemplary embodiment of an information handling system, generally designated at 100. In one form, the information handling system 100 can be a computer system such as a server. As shown in FIG. 1, the information handling system 100 can include a first physical processor 102 coupled to a first host bus 104 and can further include additional processors generally designated as $n^{th}$ physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include an Accelerated Hub Architecture (AHA) that uses a dedicated bus to transfer data between first physical processor 102 and the $n^{th}$ physical processor 106. For example, the chipset 110, including an AHA enabled-chipset, can include a memory controller hub and an input/output (I/O) controller hub. As a memory controller hub, the chipset 110 can function to provide access to first physical processor 102 using first bus 104 and $n^{th}$ physical processor 106 using the second host bus 108. The chipset 110 can also provide a memory interface for accessing memory 112 using a memory bus 114. In a particular embodiment, the buses 104, 108, and 114 can be individual buses or part of the same bus. The chipset 110 can also provide bus control and can handle transfers between the buses 104, 108, and 114.

According to another aspect, the chipset 110 can be generally considered an application specific chipset that provides connectivity to various buses, and integrates other system functions. For example, the chipset 110 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 110. The chipset 110 can also be packaged as an application specific integrated circuit (ASIC).

The information handling system 100 can also include a video graphics interface 122 that can be coupled to the chipset 110 using a third host bus 124. In one form, the video graphics interface 122 can be an Accelerated Graphics Port (AGP) interface to display content within a video display unit 126. Other graphics interfaces may also be used. The video graphics interface 122 can provide a video display output 128 to the video display unit 126. The video display unit 126 can include one or more types of video displays such as a flat panel display (FPD) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a Peripheral Component Interconnect (PCI) bus or a high speed PCI-Express bus. In one embodiment, a PCI bus can be operated at approximately 66 MHz and a PCI-Express bus can be operated at approximately 128 Mhz. PCI buses and PCI-Express buses can be provided to comply with industry standards for connecting and communicating between various PCI-enabled hardware devices. Other buses can also be provided in association with, or independent of, the I/O bus 120 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the $n^{th}$ physical processor 106. The chipset 110 can also include a Southbridge portion (not illustrated) of the chipset 110 and can handle I/O functions of the chipset 110. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a disk controller 132 coupled to the I/O bus 120, and connecting one or more internal disk drives such as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive.

The information handling system 100 can also include a network interface card 140 coupled to coupled to the I/O interface 130 via a bus 142 which can be configured as I/O bus 120. The network interface card 140 can be configured to communicate public or non-secure data packets and can also be configured to communicate secure or encrypted data packets.

The information handling system 100 can also include a trusted platform manager (TPM) 150 coupled to the chipset 110 using a trusted or secure communication bus 156, such as a low pin count (LPC) bus, or other secure communication buses, or any combination thereof. The TPM 150 includes a migration monitor 152 and local memory 154 configured to store information that can be used in connection with migrating a virtual environment between remote, physical servers, systems, information handling systems, or any combination thereof. According to an aspect, the local memory can include access keys that can be secured or locked within the local memory, limiting use of the access keys to the TPM 150 in connection with managing use and migration of virtual environments.

According to another aspect, the TPM 150 can be used to manage one or more virtual environments used on separate, physical servers (not illustrated) remote to the information handling system 100. In this manner, a TPM local to each of the remote physical servers need not be used to control or manage a virtual environment that can be deployed by the TPM 150. Additionally, control, such as eminent domain of the virtual environments, can be maintained by the TPM 150.

Figure 2:
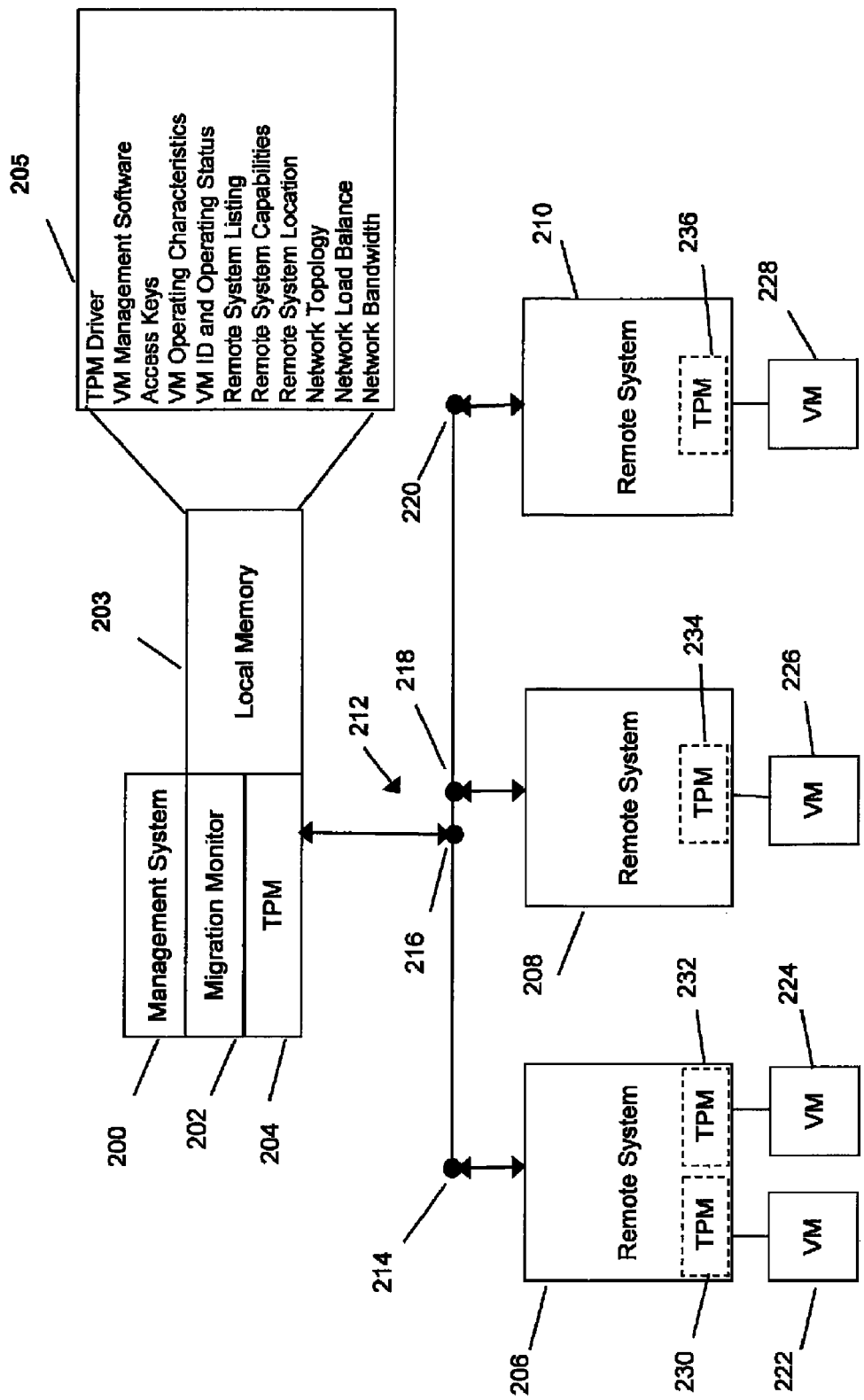
FIG. 2 illustrates a block diagram of a remote virtualized environment capable of migrating between physical systems according to another aspect of the disclosure.

FIG. 2 illustrates a block diagram of a remote virtualized environment capable of migrating between physical systems. A management system, generally illustrated at 200, can include a migration monitor 202, and a trusted platform manager 204. The management system 200 can be coupled to one or more of a remote system 206, a remote system 208, a remote system 210, or any combination thereof. Additional or separate remote systems (not illustrated) can also be coupled to the management system 200 as desired. The remote systems 206, 208, 210 can be coupled to the management system 200 using via a network 212 that can be configured to include a public network, a private network, a secure network, a dedicated network or bus, or any combination thereof The network 212 can also include a first node 214 coupling the remote system 206, a second node 216 coupled to the management system 200, a third node 218 coupled to the remote system 208, and a fourth node 220 coupled to the remote system 210. Other combinations of nodes can be used to connect the management system 200 and one or more remote system 206, 208, 210.

According to a further aspect, the remote system 206 can include a first virtualized environment 222, and a second virtualized environment 224. The remote system 208 can also include a virtualized environment 226. The remote system 210 can include a virtualized environment 228.

According to an aspect, the TPM can be configured to include a local memory 203 storing information that can be used to manage virtualized environments 222, 224, 226, 228. For example, the local memory 203 alone or in combination with other storage devices (not illustrated) of the management system 200, can include TPM driver information, virtual manager (VM) management software, access keys, VM operating characteristics, VM identification, and VM operating status of each VM 222, 224, 226, 228, or other VM that may not be currently operating (not illustrated).

According to an additional aspect, the local memory 203, alone or in combination with other storage devices (not illustrated) of the management system 200, can also include a remote system listing of available systems to migrate and operate a VM, remote system capabilities information, and a remote system location or interne protocol (IP) address. Also stored can include network topology information, network load balance information, network bandwidth which can include remote system bandwidth capabilities, and network reliance or reliability information. Other data or information that can be used to migrate VMs from a remote system to another remote system can also be stored as needed or desired.

According to one aspect, access keys stored within the local memory 203 can be locked within the local memory 203. For example, an access key of the remote system 210 may only be deployed by the TPM 204 of the management system 200. According to a further aspect, each VM 222, 224, 226, 228 can each include a virtual TPM having specific keys to enable and disable use of a VM on a specific remote system. According to a further aspect, the remote system 206 can include a TPM 230 operably coupled to the VM 222, and a TPM 232 operably coupled to the VM 224. Additionally, the remote system 208 can include a TPM 234 operably coupled to the VM 226, and the remote system 210 can include a TPM 236 operably coupled to the VM 228. Each TPM 230, 232, 234, 236 can be configured as a virtual TPM configured to enable communication with an associated VM using VM software and driver interfaces. As a virtual VM, the use of local TPMs used by each remote system (not illustrated) can be obviated, allowing TPM 204 of the management system 200 to have control over use of each TPM 230, 232, 234, 236. For example, each TPM 230, 232, 234, 236 will be mapped to the TPM 204, and the TPM 204 will allocate portions of the local memory 203 to be used by each TPM 230, 232, 234, 236. Additionally, as one or more of the VM 222, 224, 226, 228 migrates between remote servers, the same set of access keys mapped to a specific VM will be maintained and mapped to the VM and stored within the local memory 203 allowing seamless migration of VMs to separate systems, and obviating the need to install access keys on remote systems.

Figure 3:
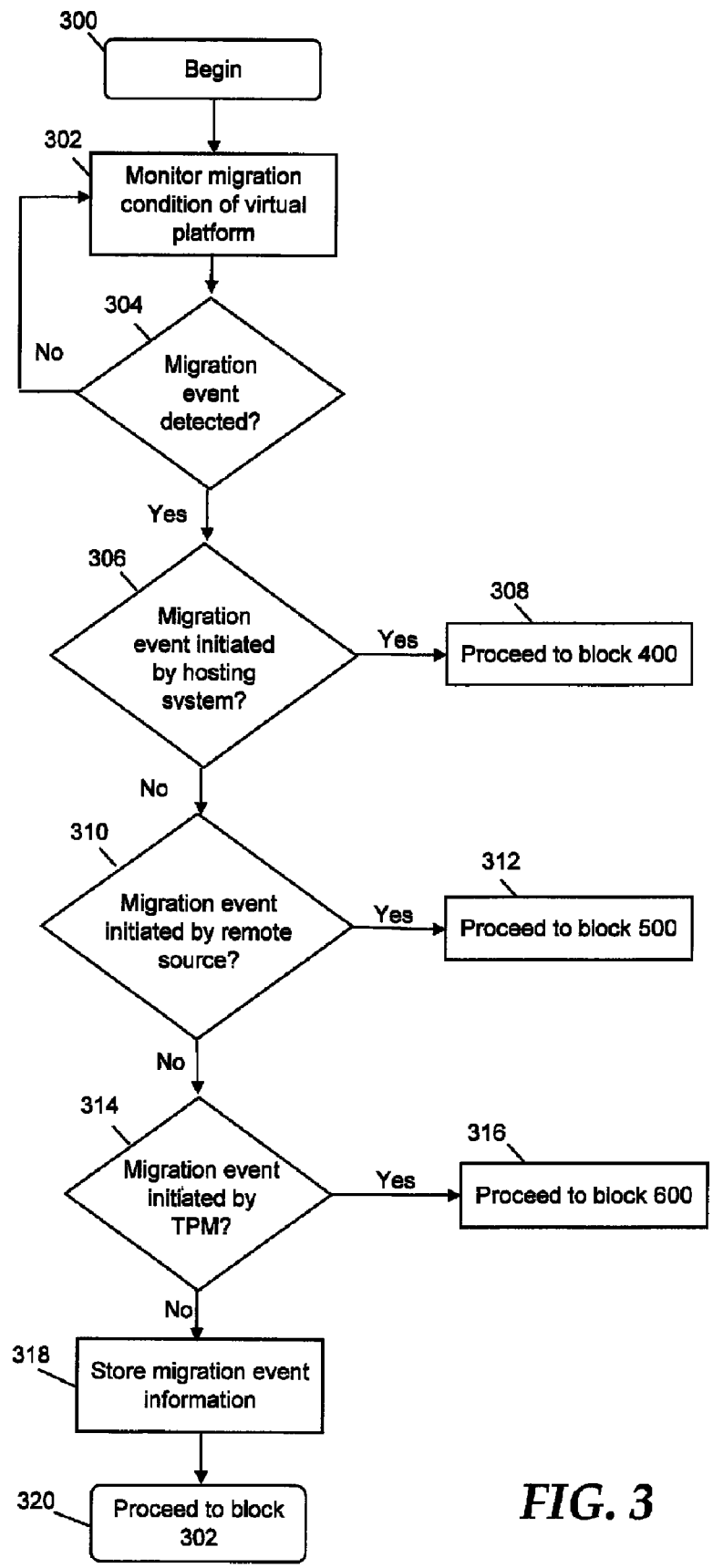
FIG. 3 illustrates a flow diagram of a method of detecting a migration event according to a further aspect of the disclosure.

FIG. 3 illustrates a flow diagram of a method of detecting a migration event according to a further aspect of the disclosure. The method begins generally at block 300. At block 302, a migration condition of a virtual platform can be monitored to detect whether to migrate a virtual environment from a first system to another system. For example, operating conditions, events, statuses, levels, or various other characteristics of a remote system operating the virtual environment can be monitored. At block 304, a migration event can be detected, and proceed to block 306. If at block 304, a migration event may not be detected, the method can proceed to block 302. Upon detecting a migration event at block 304, the method can proceed to block 306 and detects if the migration event may have been initiated by a hosting system. For example, a hosting system can include a system currently operating the virtual environment. As such, an operating characteristic of the hosting system may change and a migration event may be requested by the hosting system. For example, a hosting system may have surpassed a performance capability of the virtual environment. As such, the hosting system may issue a request to migrate the virtual environment. Various other system, network, bandwidth, performance, operating characteristics can also be monitored to ensure performance of the virtual environment can be maintained. If at block 306, a migration event may be initiated by a hosting system, the method can proceed to block 308, and to block 400 illustrated in FIG. 4.

If at block 306, a migration event may not be initiated by a hosting system, the method can proceed to block 310 and detects if the migration event may be initiated by a trusted platform module. For example, the trusted platform module can monitor performance of a hosting system to detect network performance, host system performance, network reliability, bandwidth availability, security integrity, and any other operating characteristic that can be monitored to ensure performance of a hosting system may be maintained. If a migration event initiated by a TPM may be detected, the method can proceed to block 312 and to block 500.

If at block 310, a migration event initiated by a TPM may not be detected, the method can proceed to block 314 and detects whether a valid remote source may have initiated the migration event. If a valid remote source may be detected, the method can proceed to block 316 and to block 600 as described in FIG. 6. If a remote source may not be detected at block 314, the method can proceed to block 318 and the migration event can be stored within an event log of a memory of the TPM or other accessible memory. A system administrator, application, or other monitor system can access the event log to detect the event that initiated the migration event. For example, the event log can store date and time stamped operating status information of the virtual environment, hosting system, network location, security integrity, operation of associated devices or drives local to the hosting system, memory availability of the hosting system, performance data of the hosting system, or various other types of information that can be combined to identify an operating condition that may have triggered a migration event. As such, the log can be accessed at a later time to update a migration event listing that can be monitored alone in combination with a host system, a remote source, a TPM, or a migration monitor. Upon storing the migration event information, the method can proceed to block 320, and to block 302.

Figure 4:
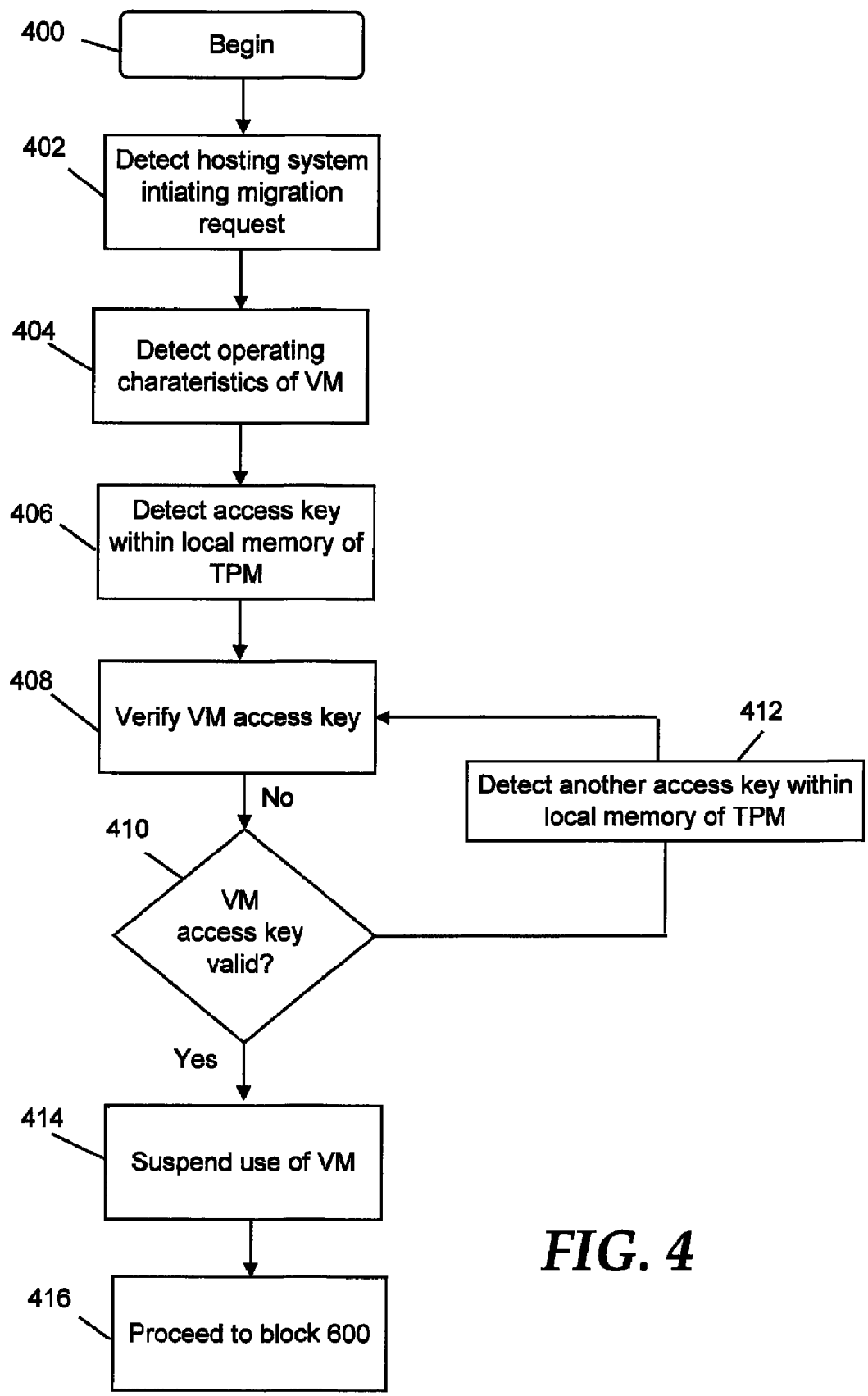
FIG. 4 illustrates a flow diagram of a method of detecting a migration event initiated by a remote hosting system according to a further aspect of the disclosure.

FIG. 4 illustrates a flow diagram of a method of detecting a migration event initiated by a remote hosting system according to a further aspect of the disclosure. The method can begin at block 400. At block 402, a hosting system initiating a migration request can be detected. For example, a hosting system currently operating a virtual environment can be identified by a system ID, network IP address, processor ID, or any other identifying metric. According to an aspect, the hosting system can initiate a migration request due to operating conditions of the remote system. For example, the remote system can be experiencing a system overload, desire load balancing, experience an error condition, or experience a maintenance or override condition. In a form, scheduled maintenance may need to be performed on the hosting system. In other forms, an increase or decrease in performance or system capabilities can be detected, an increase or decrease in bandwidth can be detected, an increase or decrease in operating capabilities can be detected, an increase or decrease in security levels can be detected, or any combination thereof. Other capabilities or operating conditions of the hosting system can also be identified to initiate a migration request.

Upon detecting a hosting system, the method can proceed to block 404 and detects operating characteristics of the VM currently operated by the hosting system. For example, the VM may desire to have a certain level of processing capabilities, memory capabilities, security capabilities, access to other resources, bandwidth capabilities, network reliability, or any combination thereof. Upon identifying the operating characteristics of the VM, the method can proceed to block 406 and detects an access key of the VM stored within the local memory of the TPM. The method can proceed to block 408 and verifies the VM access key. If at decision block 410, the access key cannot be validated, the method can proceed to block 412 and accesses the local memory to detect another access key. The method can then proceed to block 408 as described above. According to an aspect, if there is no valid access key within the local memory, an error message can be stored within a data log, and an email or text message notification sent to a system administrator notifying the administrator that a migration request error has occurred.

If at decision block 410 a VM access key can be validated, the method can proceed to block 414 and use of the VM can be suspended. For example, the VM can be placed in a suspend state in preparation to migrate the VM between remote systems. In other forms, it may not be necessary to suspend the VM. The method can then proceed to block 416, and to block 600 described in FIG. 6.

Figure 5:
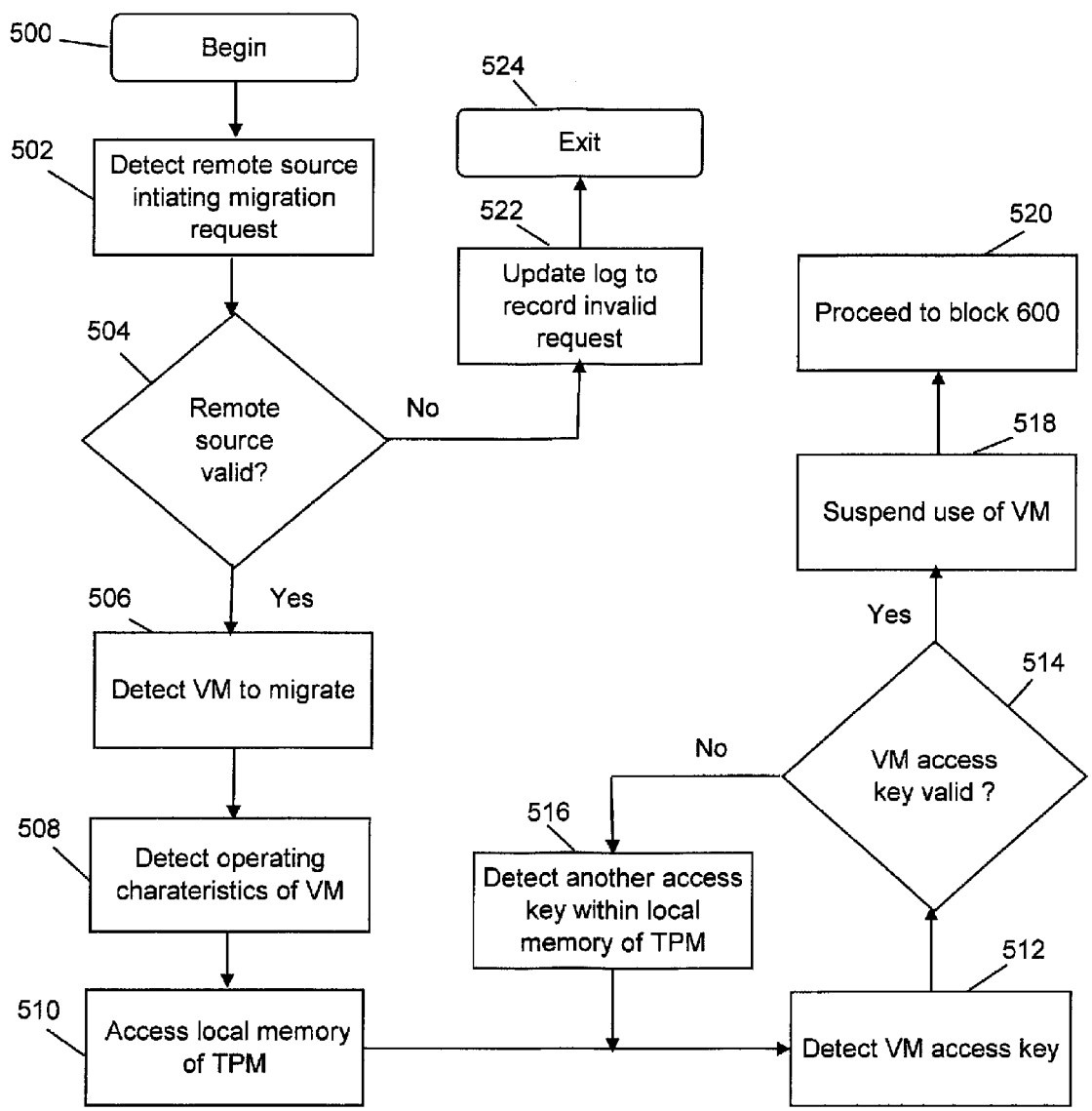
FIG. 5 illustrates a flow diagram of a method of detecting a migration event initiated by a remote source according to another aspect of the disclosure.

FIG. 5 illustrates a flow diagram of a method of detecting a migration event initiated by a remote source according to another aspect of the disclosure. The method begins generally at block 500. At block 502, a remote source initiating a migration request can be detected. For example, a remote source can include a system manager, network manager, security manager, or various other forms of managers, monitors, applications, or any combination thereof configured to initiate migration of a virtual environment. Upon detecting the remote source, the method can proceed to decision block 504 and determines whether the remote source may be valid. For example, a source ID can be detected and compared to a listing of valid remote sources having migration rights over a specific virtual environment. If at decision block 504 a remote source may be invalid, the method can proceed to block 522 and an event log can be updated to include the invalid request. The method can then proceed to block 524 and exits.

If at decision block 504, a remote source can be validated, the method can proceed to block 506 and detects a VM to migrate. The method can then proceed to block 508 and detects operating characteristics of the VM. For example, a local memory to a host system TPM can include operating characteristics of the VM. The method can then proceed to block 510 and the local memory of the TPM can be accessed to detect a VM access key of the VM. Upon accessing the local memory, the method can proceed to block 512 and detects a VM access key. For example, a plurality of access keys that can be used by a plurality of specific VM can be stored within the local memory. At decision block 514, the method can validate the VM access key. If at decision block 514, the access key cannot be validated, the method can proceed to block 516 and detects another access key stored within the local memory of the TPM. The method can then proceed to block 512 as described above.

If at decision block 514 the access key can be validated, the method can proceed to block 518 and the VM can be suspended if desired. The method can then proceed to block 520 and to block 600 as described in FIG. 6 below.

Figure 6:
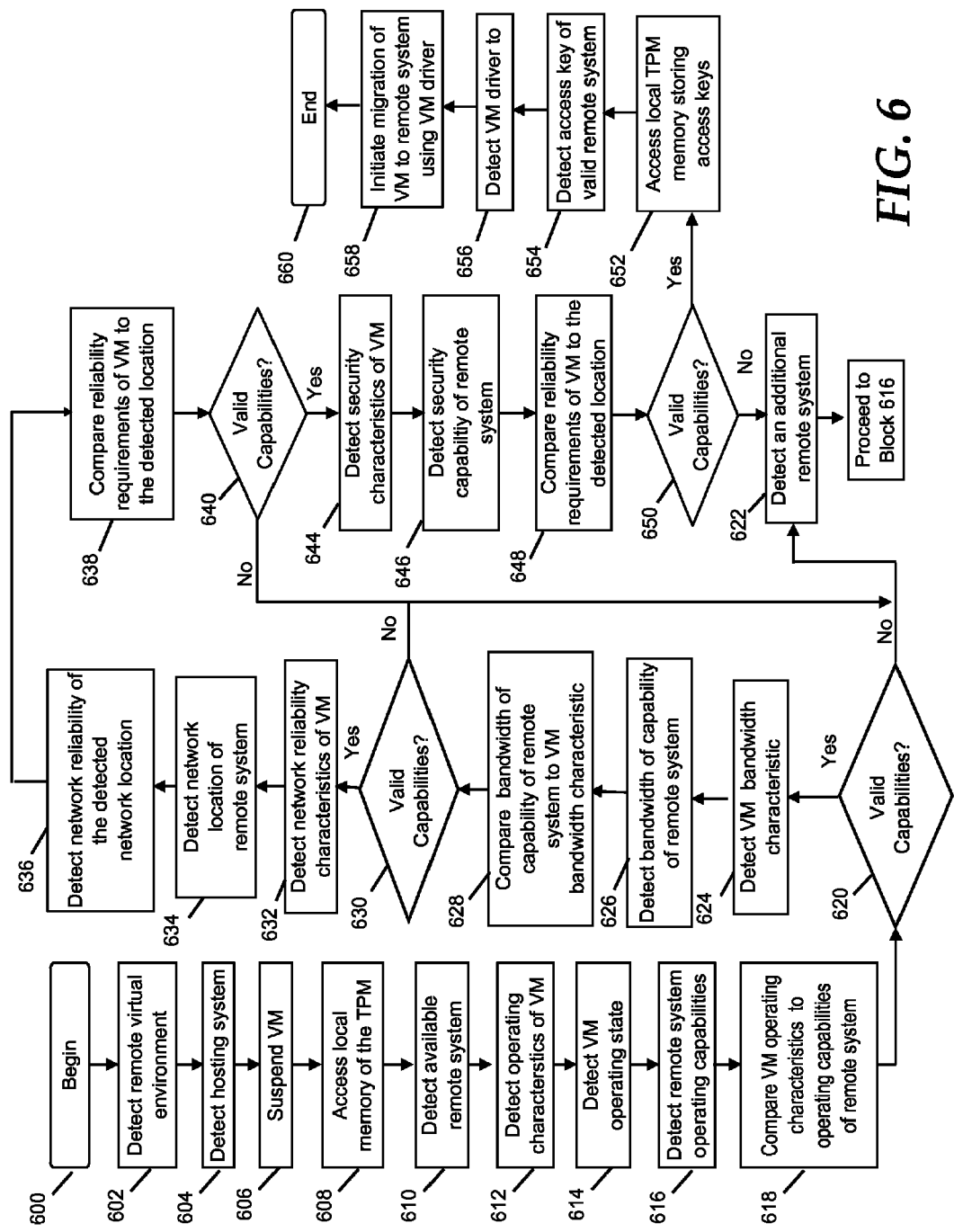
FIG. 6 illustrates a flow diagram of a method of initiating migration of a virtualized environment according to a further aspect of the disclosure.

FIG. 6 illustrates a flow diagram of a method of initiating migration of a virtualized environment according to a further aspect of the disclosure. The method begins generally at block 600. At block 602, a remote virtual environment to migrate can be detected. The method can proceed to block 604 and a remote system hosting the VM to migrate can also be detected. The method can then proceed to block 606 and the VM to migrate can be suspended if desired. The method can then proceed to block 608 and local memory of the TPM can be accessed to identify an available remote system to migrate the VM to. The method can then proceed to block 612 and detects operating characteristics of the VM to migrate. Upon detecting the operating characteristics of the VM, the method can proceed to block 614 and detects an operating state of the VM to migrate. For example, the VM can be in a suspended operating state, a stand-by state, a low-power state, or various other operating states.

The method can then proceed to block 616 and detects operating capabilities of an available remote system to migrate the VM to and operate. The method can then proceed to block 618 and compares the VM operating characteristics to operating capabilities of the remote system. The method can then proceed to block 620 and detects whether the capabilities of the remote system can be validated. If the capabilities cannot be validated, the method can proceed to block 622 and an additional remote system can be detected. The method can then proceed to block 616 as described above.

If at decision block 620, the capabilities of the remote system can be validated, the method can proceed to block 624 and detects a bandwidth characteristic desired by the VM. The method can then proceed to block 626 and detects a bandwidth capability of a remote system. At block 628, the bandwidth capability of the remote system can be compared to the bandwidth characteristic of the VM, and to decision block 630 to detect if the bandwidth capabilities can be validated. If the bandwidth capabilities of the remote system cannot be validated, the method can proceed to block 622 as described above.

If at decision block 630, the capabilities of the remote system can be validated, the method can proceed to block 632 and detects a network reliability characteristic desired by the VM. The method can then proceed to block 634 and detects a network location of the remote system, and to block 636 to detect the reliability of the network location. At block 638, the network reliability capability can be compared to the network reliability characteristic of the VM, and to decision block 640 to detect if the network reliability capabilities can be validated. If the network reliability capabilities cannot be validated, the method can proceed to block 622 as described above.

If at decision block 640, the network reliability capabilities can be validated, the method can proceed to block 644 and detects a security characteristic desired by the VM. The method can then proceed to block 646 and detects a security capability of a remote system. At block 648, the security capability of the remote system can be compared to the security characteristic of the VM, and to decision block 650 to detect if the security capability can be validated. If the security capability of the remote system cannot be validated, the method can proceed to block 622 as described above.

If at decision block 650, the security capabilities can be validated, the method can proceed to block 652 and local memory of the TPM can be accessed to identify a valid access key to be used with the remote system and the VM to be migrated. The method can proceed to block 654 and detect the valid access key, and to block 656 to detect a VM driver to use. For example, the local memory or other memory accessible to the management system can be accessed to detect a driver to be used by the remote system when operating the VM. The method can then proceed to block 658 and migration of the VM can begin between the current system and the new remote system using the identified VM driver.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a migration monitor configured to initiate migration of a remote virtualized environment operating on a first remote system; and
   a trusted platform module coupled to a chipset using a secure communication bus, the trusted platform module including a local memory storing an access key configured to enable the remote virtualized environment, wherein the access key is locked within the local memory;
   wherein:
   the migration monitor is configured to determine that a second remote system is capable of satisfying an operating characteristic of the remote virtualized environment; and
   wherein the trusted platform module is configured to:
   provide the access key to the second remote system via a secure communication channel, to initiate the remote virtualized environment on the second remote system; and
   process trusted platform module transactions from the remote virtualized environment.

2. The system of claim 1 wherein the migration monitor is further configured to:
   detect an invalid operating condition of the second remote system and disable use of the remote virtualized environment at the second remote system;
   determine that a third remote system is capable of satisfying the operating condition of the remote virtualized environment; and
   initiate the migration of the remote virtualized environment to the third remote system using the access key stored within the local memory.

3. The system of claim 2 wherein the trusted platform module is further configured to maintain primary control over the migration of a plurality of virtualized environments operating on a plurality of remote systems, wherein the local memory includes a plurality of access keys configured to be used with the plurality of virtualized environments.

4. The system of claim 1 wherein the migration monitor is further configured to:
   detect a scheduled maintenance event of the first remote system operating the remote virtualized environment;
   detect whether the second remote is system capable of operating the remote virtualized environment, wherein the second remote system is remote to the first remote system and the trusted platform module; and
   initiate a migration event to migrate the virtualized environment from the first remote system to the second remote system.

5. The system of claim 1 wherein the migration monitor is further configured to:
   detect the operating characteristic of the remote virtualized environment, wherein the operating characteristic includes a bandwidth characteristic;
   detect the second remote system;
   detect a bandwidth capability of the second remote system;
   compare the bandwidth capability of the second remote system to the bandwidth characteristic;
   initiate migration of the remote virtualized environment from the first remote system to the second remote system in response to a valid comparison of the bandwidth capability of the second remote system to the bandwidth characteristic of the remote virtualized environment;
   disable migration of the remote virtualized environment from the first remote system to the second remote system in response to an invalid comparison of the bandwidth capability of the second remote system to the bandwidth characteristic of the remote virtualized environment; and
   initiate identification of another remote system configured to satisfy the bandwidth characteristic of the remote virtualized environment.

6. The system of claim 1 wherein the migration monitor is further configured to:
   detect the operating characteristic of the remote virtualized environment, wherein the operating characteristic includes a network reliability characteristic;

detect a second remote system;
detect a second bandwidth capability of the second remote system;
compare the network reliability capability of the second remote system to the network reliability characteristic;
initiate migration of the remote virtualized environment from the first remote system to the second remote system in response to a valid comparison result;
disable migration of the remote virtualized environment from the first remote system to the second remote system in response to an invalid comparison result; and
initiate identification of another remote system configured to satisfy the network reliability characteristic.

7. The system of claim 1 wherein the trusted platform module includes the migration monitor.

8. A method of migrating a virtualized environment for use with an information handling system, the method comprising the steps of:
detecting at a migration monitor of the information handling system a migration event of a remote virtualized environment;
detecting an availability of a destination system to migrate the remote virtualized environment;
detecting an access key of the remote virtualized environment operable to enable use of the remote virtualized environment and locked within a local memory of a trusted platform module of the information handling system, wherein the trusted platform module is not a part of the remote virtualized environment or the destination system, and the trusted platform module is coupled to the information handling system using a secure communication bus;
initiating a migration of the remote virtualized environment to the destination system in response to detecting the availability;
providing from the trusted platform module the access key to the destination system via a secure network connection between the trusted platform manager and the remote virtualized environment, to initiate the remote virtualized environment on the destination system; and
processing trusted platform module transactions from the remote virtualized environment at the trusted platform module.

9. The method of claim 8 further comprising:
detecting an application driver configured to enable migration of the remote virtualized environment from a source system to the destination system; and
initiating use of the application driver using the trusted platform manager;
wherein initiating migration of the remote virtualization environment comprises using the application driver and a migration monitor to transfer the remote virtualization environment from the source system to the destination system.

10. The method of claim 8 further comprising:
receiving a migration event request via the secure network connection; and
wherein initiating the migration of the remote virtualized environment to the destination system is via non-secure network traffic.

11. The method of claim 8 further comprising:
suspending use of the remote virtualized environment at a source system; and
detecting an operating state of the remote virtualized environment;
wherein detecting the availability of the destination system is in response to the operating state and a capability of the destination system to operate the remote virtualized environment.

12. The method of claim 8 further comprising:
detecting a bandwidth characteristic of the remote virtualized environment;
detecting the destination system;
comparing a bandwidth capability at the destination system to the bandwidth characteristic of the remote virtualized environment; and
enabling migration of the remote virtualized environment to the destination system in response to the comparison.

13. The method of claim 8 further comprising:
detecting an operating characteristic of the remote virtualized environment;
detecting the destination system;
comparing an operating capability of the destination system to the operating characteristic of the virtualized environment; and
enabling migration of the virtualized environment to the destination system in response to the comparison.

14. The method of claim 8 further comprising:
detecting a network location of the destination system;
detecting a network reliability of the network location;
detecting a network reliability characteristic of the remote virtualized environment;
comparing a network reliability to the network reliability characteristic; and
enabling migration of the remote virtualized environment to the destination system in response to the comparison.

15. The method of claim 8 further comprising:
detecting a security characteristic of the remote virtualized environment;
detecting a security capability of the destination system;
comparing a security characteristic of the remote virtualized environment to the security capability of the destination system; and
enabling migration of the remote virtualized environment to the destination system in response to the comparison.

16. The method of claim 8 further comprising:
wherein detecting the migration event occurs via an administrative activity of a first system hosting the remote virtual environment;
receiving the migration request from the first system; and
initiating migration of the remote virtual environment.

17. The method of claim 8 further comprising:
wherein detecting the migration event occurs via at a trusted platform module remotely located to the remote virtual environment;
detecting a network location to migrate the remote virtual environment;
initiating a suspend of the remote virtual environment;
detecting the suspend state of the remote virtual environment at the trusted platform module; and
initiating migration of the virtual environment from the remote system to the destination system using the access key.

18. An information handling system comprising:
a migration monitor configured to initiate migration of a remote virtualized environment operating on a first remote system; and
a trusted platform module coupled to a chipset using a secure communication bus, the trusted platform module including a local memory storing an access key configured to enable use of the remote virtualized environment, wherein access key is locked within the local memory wherein the migration monitor is configured to:
detect an operating characteristic of the remote virtualized environment operating at the first remote system;
detect a second remote system;
detect an operating capability of the second remote system;
compare the operating capability of the second remote system to the operating characteristic of the remote virtualized environment;
initiate migration of the remote virtualized environment from the first remote system to the second remote system in response to a valid comparison result;
disable migration of the remote virtualized environment from the first remote system to the second remote system in response to an invalid comparison result; and
initiate identification of another remote system configured to satisfy the operating characteristic of the remote virtualized environment; and
wherein the trusted platform module is configured to:
provide the access key to the second remote system via a secure communication channel, to initiate the remote virtualized environment on the second remote system; and
process trusted platform module transactions from the remote virtualized environment.

19. The system of claim 18 wherein the migration monitor is further configured to:
detect the operating characteristic of the remote virtualized environment as a network reliability characteristic;
detect the second remote system;
detect a second network reliability capability of the second remote system;
compare the network reliability capability of the second remote system to the network reliability characteristic;
initiate migration of the virtualized environment from the first remote system to the second remote system in response to a valid comparison result;
disable migration of the virtualized environment from the first remote system to the second remote system in response to an invalid comparison result; and
initiate identification of another remote system configured to satisfy the network reliability characteristic.

20. The system of claim 18 wherein the migration monitor is further configured to:
detect the operating characteristic of the remote virtualized environment as a bandwidth characteristic;
detect the second remote system;
detect a second bandwidth capability of the second remote system;
compare the second bandwidth capability to the bandwidth characteristic;
initiate migration of the virtualized environment from the first remote system to the second remote system in response to a valid comparison result;
disable migration of the virtualized environment from the first remote system to the second remote system in response to an invalid comparison result; and
initiate identification of another remote system configured to satisfy the bandwidth capability characteristic.

\* \* \* \* \*